(12) United States Patent
Carlough et al.

(10) Patent No.: US 9,697,074 B2
(45) Date of Patent: *Jul. 4, 2017

(54) NON-LOCAL ERROR DETECTION IN PROCESSOR SYSTEMS

(71) Applicant: International Business Machines Corporation, Armonk, NY (US)

(72) Inventors: Steven R. Carlough, Poughkeepsie, NY (US); James R. Cuffney, Poughkeepsie, NY (US); Michael Klein, Schoenaich (DE); Silvia M. Mueller, Altdorf (DE)

(73) Assignee: Internatioanl Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/567,344

(22) Filed: Dec. 11, 2014

(65) Prior Publication Data

US 2016/0170828 A1    Jun. 16, 2016

(51) Int. Cl.
| | |
|---|---|
| *G06F 11/00* | (2006.01) |
| *G06F 11/10* | (2006.01) |
| *G06F 9/38* | (2006.01) |
| *G06F 11/30* | (2006.01) |
| *G06F 11/34* | (2006.01) |

(52) U.S. Cl.
CPC ........ *G06F 11/1004* (2013.01); *G06F 9/3867* (2013.01); *G06F 11/3024* (2013.01); *G06F 11/3409* (2013.01)

(58) Field of Classification Search
None
See application file for complete search history.

(56) References Cited

U.S. PATENT DOCUMENTS

| | | | | |
|---|---|---|---|---|
| 5,535,331 A | * | 7/1996 | Swoboda | G06F 15/786 712/E9.016 |
| 6,516,443 B1 | * | 2/2003 | Zook | G11B 20/10009 714/792 |
| 6,611,909 B1 | * | 8/2003 | Roos | G06F 9/261 712/211 |

(Continued)

OTHER PUBLICATIONS

"Non-Local Error Detection in Processor Systems", U.S. Appl. No. 14/953,459, filed Nov. 13, 2015.

(Continued)

*Primary Examiner* — M. Mujtaba Chaudry
(74) *Attorney, Agent, or Firm* — Isaac J. Gooshaw

(57) ABSTRACT

A method for delocalizing an error checking on a data in a pipelined processor from the data checked. A first check-data is generated at a first location on a first data. A second location receives the first data and the first check-data. A second check-data is generated on the first data and the first check-data is compared with the second check-data at the second location. A second data is generated from the first data and a third check-data is generated on the second data at the second location. A third check-data is generated on the second data at the second location and the second data is transferred to a third location. The third check-data is transferred to a fourth location. A fourth check-data is generated on the second data and is transferred to the fourth location. The fourth check-data and the third check-data are compared at the fourth location.

20 Claims, 4 Drawing Sheets

(56) References Cited

U.S. PATENT DOCUMENTS

| | | |
|---|---|---|
| 6,701,484 B1 | 3/2004 | Jordan et al. |
| 7,512,772 B2 | 3/2009 | Gschwind et al. |
| 7,689,804 B2 | 3/2010 | Vera et al. |
| 8,352,812 B2 | 1/2013 | Vera et al. |
| 2006/0156177 A1 | 7/2006 | Kottapalli et al. |
| 2008/0001642 A1* | 1/2008 | Yun .................. H03L 7/0812 327/161 |
| 2009/0168525 A1* | 7/2009 | Olbrich ............. G06F 13/1657 365/185.11 |
| 2013/0151891 A1* | 6/2013 | Piry .................. G06F 11/0721 714/10 |
| 2014/0136895 A1 | 5/2014 | Fleischer et al. |

OTHER PUBLICATIONS

IBM Appendix P, list of IBM patents or patent applications treated as related, pp. 1-2.

Lee, et al., "A Compiler Optimization to Reduce Soft Errors in Register Files", pp. 41-49, LCTES'09, Jun. 19-20, 2009, Dublin, Ireland, Copyright 2009, ACM 978-1-60558-356-3/09/06, doi>10.1145/1542452.1542459.

Sanda, et al., "Soft-error resilience of the IBM POWER6 processor", IBM J. Res & Dev, vol. 52; No. 3, May 2008, copyright 2008, pp. 275-284.

"Method for an EEC implementation for register files on high-performance microprocessors", The IP.com Prior Art Database, Publication Date Oct. 24, 2006, Printed Jul. 25, 2014.

\* cited by examiner

NON-LOCAL ERROR DETECTION IN PROCESSOR SYSTEMS

BACKGROUND OF THE INVENTION

The present invention relates generally to the field of computer processor microarchitecture and more particularly to error checking in processor systems.

Error correcting code (ECC) and parity checking are techniques used to detect and, in the case of ECC, correct a subset of possible errors in information systems. These techniques are especially useful in computer systems. As the voltages and the dimensions of semiconductor logic are reduced and the areas consumed by semiconductor chips are increased, the opportunities for errors in a computer system increase. Common causes of errors in semiconductors are noise (e.g., power supply noise and EMF-induced noise), logic failure, and the effects of energetic particles, which can flip bits and destroy logic. Electromagnetic fields (EMF) can be generated by high semiconductor clock rates, fast changes in current magnitude and direction, and external fields generated in the local environment (e.g., lightning strikes and microwave radiation). Low voltages used to power semiconductors decrease energy consumption and facilitate small semiconductor dimensions but decrease the voltage difference between a logic 1 and a logic 0, increasing a circuit's susceptibility to noise. Soft failures are transitory while hard failures are permanent.

Parity is a widespread technique used to check data for an error whereby a bit is appended to the end of a bit-pattern to indicate whether there is an odd or even number of logic 1's in the bit-pattern. For example, the bit-pattern 10101010 can have a logic 0 appended to it, called the parity bit, to indicate that it has an even number of 1's. If one of the bits in the bit-pattern is flipped, the parity bit will be incorrect, and indicate an error. However, if two bits are flipped, the errors will go undetected as the parity bit will be correct. ECC uses a more complicated encoding with which multiple bit errors can be detected but it requires that multiple bits, called check bits or check-data, be associated with the bit pattern.

While error checking can significantly increase the reliability of computations, a disadvantage of ECC and parity checking is that their functions consume logic and therefore chip area that is often located in a region of a processor whose fast operation is critical to high performance. The area consumed by parity and ECC checking logic tends to physically spread out and separate critical logic that would otherwise be in close proximity (e.g., register file and functional unit logic), increasing signal propagation delay across the logic. This decreases performance and/or requires an increase in energy consumption to maintain a short signal transfer time over a larger chip area.

SUMMARY

Aspects of an embodiment of the present invention disclose a method for delocalizing an error checking on a data in a pipelined processor from the data checked. The method includes generating a first check-data, which is generated at a first location on a first data. The method further includes transferring the first data and the first check-data to a second location. The method further includes generating a second check-data on the first data. The method further includes comparing the first check-data with the second check-data at the second location. The method further includes generating a second data from the first data at the second location. The method further includes generating a third check-data from the second data at the second location. The method further includes transferring the second data to a third location. The method further includes transferring the third check-data from the second location to a fourth location wherein the transfer of the third check-data from the second location to the fourth location takes one or more cycles. The method further includes generating a fourth check-data from the second data. The method further includes transferring the fourth check-data from the third location to the fourth location wherein the transfer of the fourth check-data from the third location to the fourth location takes one or more cycles. The method further includes comparing the fourth check-data and the third check-data at the fourth location.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Parity and ECC techniques are often associated with error detection and correction in memories whose small geometries make them susceptible to errors, but they are also used in processors whose reliability is critical (e.g., those executing defense, financial or large simulation applications). In these processors, they are often used to check data integrity in register files and on data buses, among other things. The techniques are successful in increasing the reliability and integrity of a system. Embodiments of the present invention recognize that these techniques have a side effect when employed in processors. They consume logic area in areas of a processor that require high performance, i.e., in areas in which short data transfer times and high clock rates are advantageous. The logic that they consume tends to enlarge the area of critical logic whose high-speed operation is germane to the performance of the processor, increasing signal propagation time over increased wire-run lengths and thereby decreasing performance.

Figure 1:
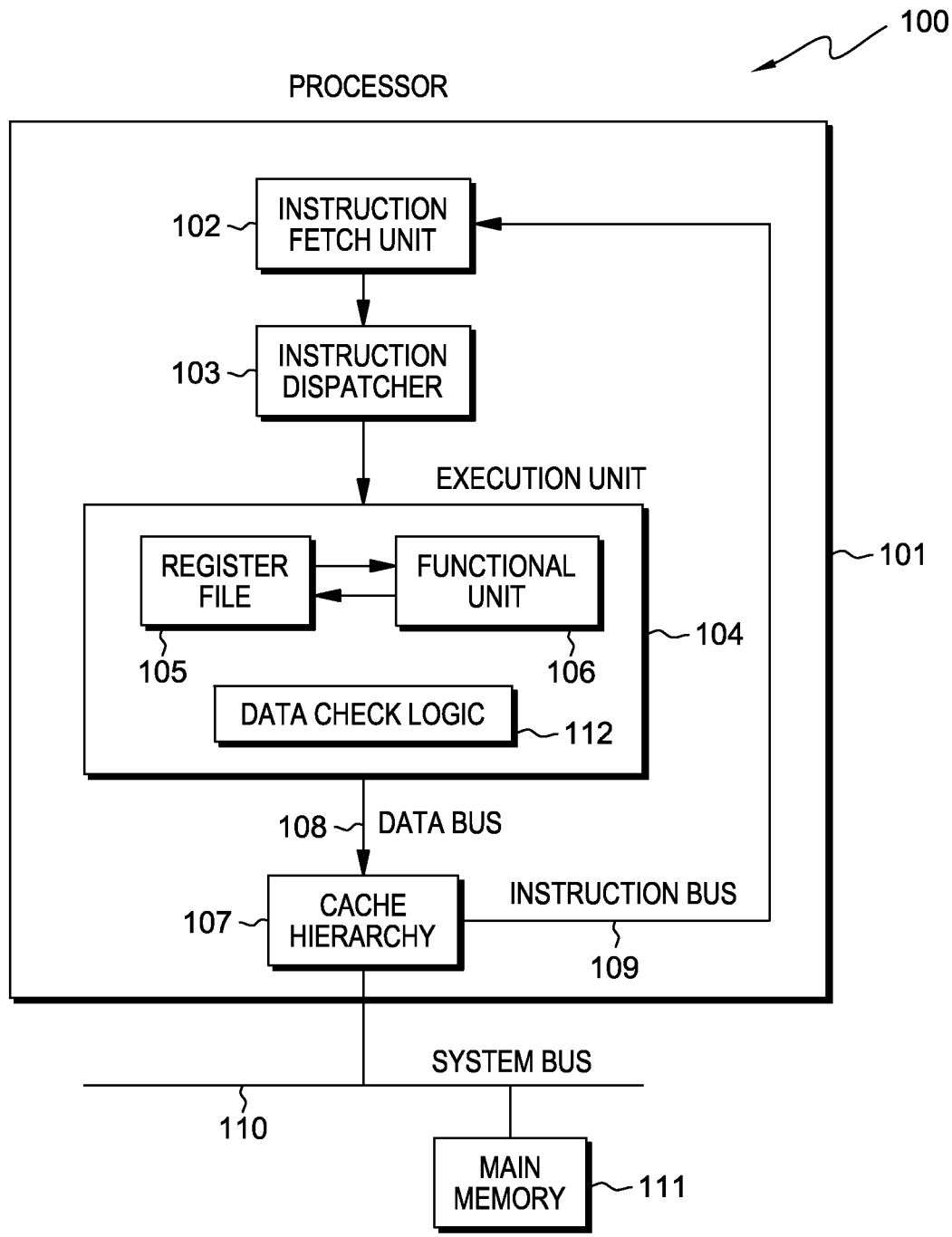
FIG. 1 depicts a block diagram of a processor complex, in accordance with an embodiment of the present invention.

FIG. 1 depicts processor complex 100 that includes processor 101 connected to main memory 111 by system bus 110. Processor 101 that contains one functional unit, functional unit 106. In an embodiment, data and instructions in main memory 111 are fetched over system bus 110 into cache hierarchy 107. An instruction is fetched from cache hierarchy 107 over instruction bus 109 by instruction fetch unit 102 and transferred to instruction dispatcher 103. The instruction is issued by instruction dispatcher 103 to execution unit 104 where the instruction is executed. The execution of the instruction can cause data to be read from register file 105 and transferred to functional unit 106 where a result can be produced from the data and written back into register file 105. During the execution of the instruction, data can also be read from cache memory 107 over data bus 108 into functional unit 106 or register file 105. During the execution of the instruction, data can also be read from register file 105 and stored in cache memory 107 over data bus 108. The result that is produced by functional unit 106 can also be stored in cache memory 107 over data bus 108.

In some scenarios and embodiments, data check logic 112 ensures the integrity of a data from the time the data is generated by functional unit 106 and stored in register file 105 to the time the data is read from register file 105. Data check logic 112 also checks the integrity of the data from the time that it is read from register file 105 to the time it is received by functional unit 106. Check-data is a group of bits that is generated from the pattern of 1's and 0's in a data, and is used to check the data for errors that may occur between the time the check-data is generated and the time that it is compared with a new check-data generated from the data. The old check-data should match the new check data if no errors have occurred since the old check data was generated. In an embodiment, a check-data is generated on the data before a checked-event (e.g., writing into a register file or a data transfer), and again after the checked-event. The check-data generated before the checked-event data is compared with the check-data generated after the checked-event and if they are equal, no error occurred to the data as a result of the checked-event.

Figure 2:
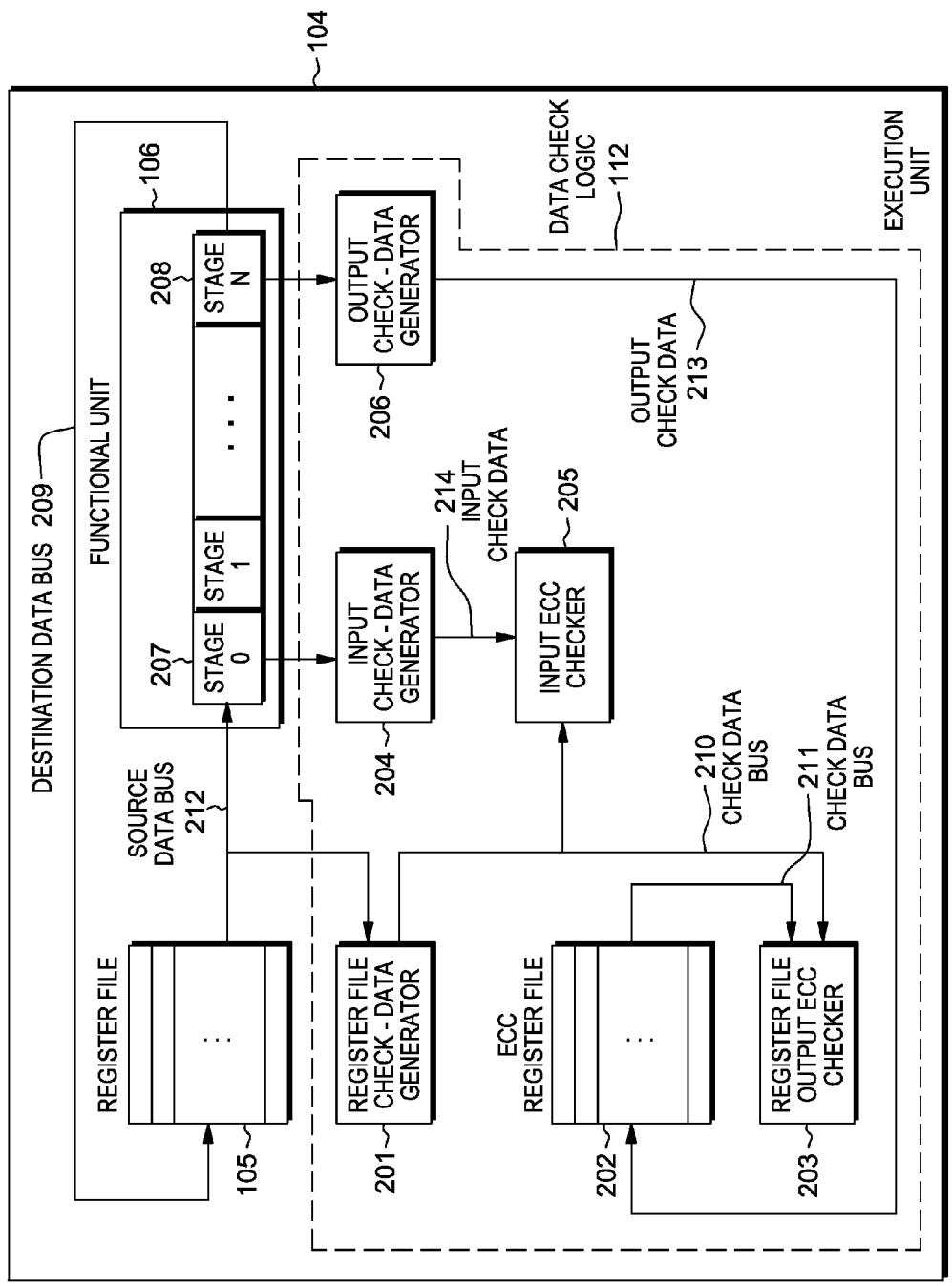
FIG. 2 depicts a functional unit in the processor complex in FIG. 1, in accordance with an embodiment of the present invention.

FIG. 2 depicts execution unit 104 in more detail. In an embodiment, data check logic 112 contains three check-data generators (register file check-data generator 201, input check-data generator 204, and output check-data generator 206) and two check-data checkers (register file output ECC checker 203 and input ECC checker 205). Data is checked before and after it is transferred from register file 105 to functional unit 106. Check-data is generated when data is read from register file 105, and again when data is received on the input to functional unit 106, and again when functional unit 106 produces a data (a result). When a data is produced by functional unit 106 (as a result of a computation) and written into register file 105, a check-data on the data is generated by output check-data generator 206 and inserted into ECC register file 202. Therefore, ECC register file 202 contains a check-data for each data in register file 105 in a one-to-one correspondence.

In some scenarios and embodiments, when an instruction is executed by execution unit 104, data is read from register file 105 (herein called reg-data), and the reg-data is transferred to both functional unit 106 and register file check-data generator 201 over source data bus 212. Register file check-data generator 201 generates a check-data (herein called reg-check-data) from the reg-data and transfers it to input ECC checker 205 and to register file output ECC checker 203 over check data bus 210. To ensure the integrity of the reg-data, register file output ECC checker 203 compares reg-check-data with a check-data (herein called ECC-reg check data). ECC-reg check data is generated by output check-data generator 206 from the result produced by functional unit 106 and stored in ECC register file 202. Register file output ECC checker 203 receives ECC-reg check data from ECC register file 202 via check data bus 211.

In some scenarios and embodiments, ECC-reg check data is stored in ECC register file 202 at essentially the same time that the reg-data is stored in register file 105. When the reg-data is transferred from register file 105 to functional unit 106, the reg-data is transferred to both stage_0 207 of functional unit 106 and to input check-data generator 204. Input check-data generator 204 generates a check-data (herein called input-check-data 214) based, at least in part, on the reg-data that stage_0 207 received. To ensure the integrity of the reg-data received by stage_0 207, input ECC checker 205 compares input-check-data 214 to reg-check-data produced by register file check-data generator 201. In this embodiment, if input-check-data 214 matches reg-check-data produced by register file check-data generator 201, then the reg-data is assumed to be free of errors.

In some scenarios and embodiments, a result (herein called functional unit data) is produced in stage_n 208 of functional unit 106. This functional unit data is generated one or more cycles after functional unit 106 receives the reg-data in stage_0 207. The functional unit data is transferred to both register file 105 (via destination bus 209) and output check-data generator 206. Output check-data generator 206 produces output check data 213 from the functional unit data. Output check data 213 is transferred to ECC register file 202 where output check data 213 becomes ECC-reg check data when output check data 213 is saved as part of ECC register file 202. The ECC-reg check data that is stored in ECC register file 202 is compared with a newly generated check-data from the functional unit data when the newly generated check-data is read from register file 105, at which time the functional unit data becomes the new reg-data read from register file 105. This technique ensures the integrity of the functional unit data from the time it is produced in stage_n 208, to the time that it is read from register file 105.

Embodiments of the present invention recognize that a physical location of input ECC checker 205, ECC register file 202, and register file output ECC checker 203 in the midst of execution unit 104 spreads out the logic of execution unit 104, and therefore increases signal propagation times. In an embodiment, the logic for check-data generators, register file check-data generator 201, input check-data generator 204, and output check-data generator 206, are physically located close to register file 105 and functional unit 106. However, the logic for register file output ECC checker 203, input ECC checker 205, and ECC register file 202 are located in a physical location that does not spread out, and therefore minimizes slowing of the operation of performance-critical logic in execution unit 104.

In some scenarios and embodiments, ECC register file 202 is in a location that is 2-cycles away from output check-data generator 206. That is, 2-cycles are required for a check-data generated by check-data generator 206 (outputcheck-data) to propagate to ECC register file 202. In an embodiment, 1-cycle is required for a check-data (e.g., reg-check-data) that is generated by register file check-data generator 201 to propagate to input ECC checker 205 and 1-cycle is required for that check-data to propagate to register file output ECC checker 203. One skilled in the art knows that the number of cycles required to transfer data from one location to another in a processor is a design decision that is based on cycle-time (the time it takes for one clock cycle to complete), logic speed, physical distance, loading on a signal line, signal line conductance, signal line capacitance, and other factors. The number of cycles it takes to propagate a signal from one location to another location in execution unit 104 can vary in other embodiments.

Figure 3:
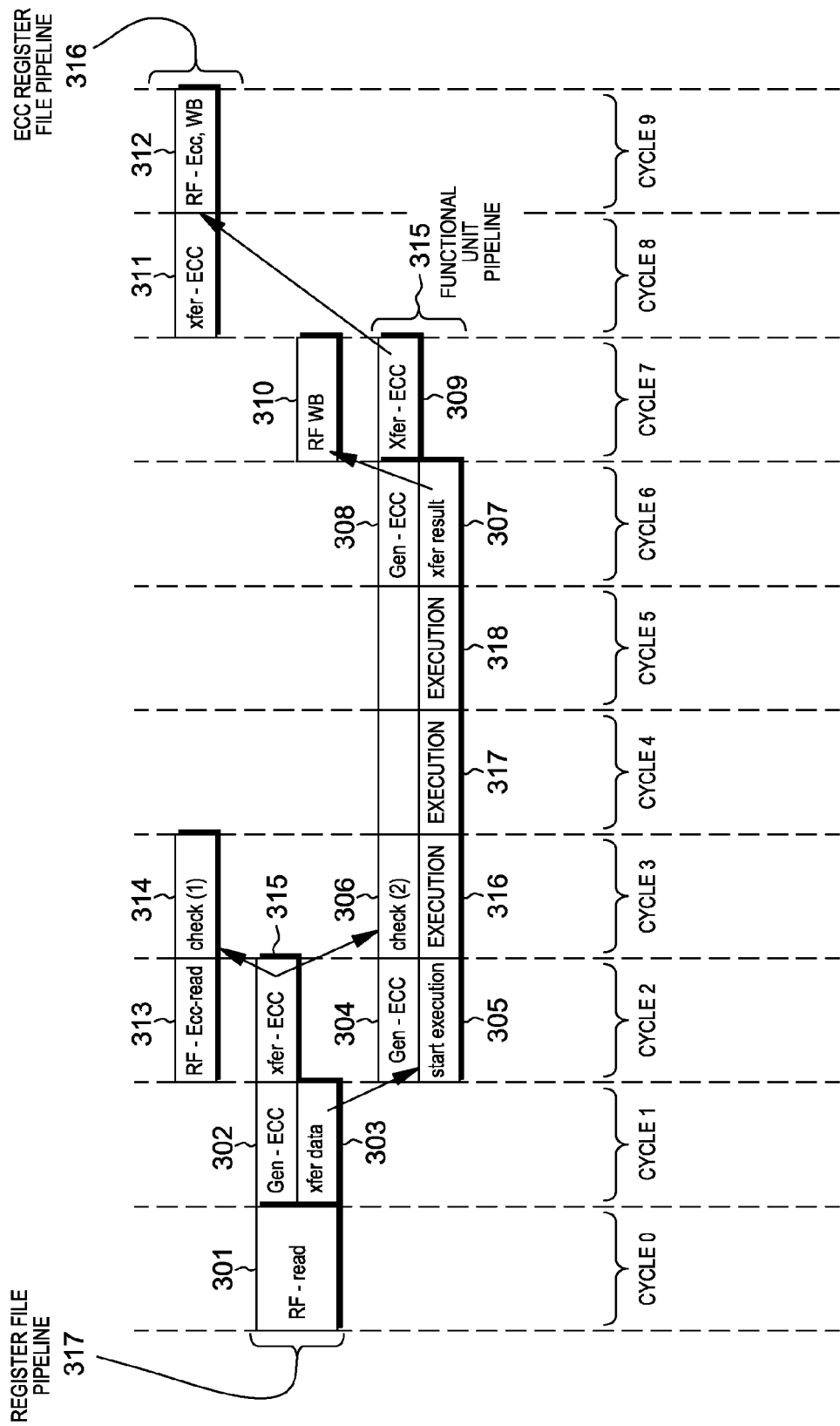
FIG. 3 depicts a block diagram of a timing of a pipeline in the functional unit shown in FIG. 2, in accordance with an embodiment of the present invention.

FIG. 3 is a depiction of the pipeline clock stages for data and check-data transfers that occur in execution unit 104, in an embodiment. A pipeline clock stage depicts the cycle and the location of an activity that occurs in execution unit 104 during its operation. Register file pipeline 317 shows the pipeline clock stages during which data is transferred to and from register file 105 and to and from register file check-data generator 201. Functional unit pipeline 315 shows the pipeline clock stages during which data is transferred to and from functional unit 106. ECC register file pipeline 316 shows the pipeline clock stages during which data is transferred to and from ECC register file 202.

In an embodiment, data (reg-data) is read in cycle 0 from register file 105 in pipeline clock stage RF-read 301 and transferred to register file check-data generator 201. Reg-data is also asserted on source data bus 212 in cycle 0. In pipeline clock stage xfer data 303 (cycle 1), the reg-data is transferred to the input of functional unit 106 on source data bus 212. In pipeline clock stage 302 (cycle 1), register file check-data generator 201 generates a check-data (reg-check-data), from the reg-data that it received in cycle 0.

In cycle 2, in pipeline clock stage start execution 305 receives the reg-data that was asserted on source data bus 212 in cycle 1 and starts to execute an instruction that uses reg-data as input data. Pipeline clock stage start execution 305 is the first clock stage of functional unit pipeline 315 which consists of pipeline clock stages start execution 305 (cycle 2), execution 316 (cycle 3), execution 317 (cycle 4), execution 318 (cycle 5), xfer-result 307 (cycle 6) and xfer-ECC 309 (cycle 7). Also in cycle 2, in pipeline clock stage 315, reg-check-data is transferred from register file check-data generator 201 to register file output ECC checker 203 and to input ECC checker 205. Additionally in cycle 2, ECC register file 202 is accessed for check data associated with the reg-data read from register file 105 in pipeline clock stage 301 (cycle 0). This check data is output check-data from output check-data generator 206 that had been stored in ECC register file 202 when the reg-data had been stored in register file 105. In an embodiment, ECC register file 202 is read 2-cycles after register file 105 is read. ECC register file 202 can therefore be in a physical location that is 2-cycles away from register file 105 in signal propagation time. In an embodiment, the physical location of ECC register file 202 is in a location that does not spread performance-critical logic in execution unit 104.

In cycle 3 (in pipeline clock stage 314), reg-check-data generated by register file check-data generator 201 is compared with the check-data access from ECC register file 202 that occurred in cycle 2 (in pipeline clock stage RF-ECC-read 313). Also in cycle 3 (in pipeline clock stage 306), input ECC checker 205 compares check data from input check-data generator 204 (input check data 214) with check data from register check-data generator 201 (reg-check-data).

Additionally in cycle 3, functional unit 106 continues to process reg-data (in pipeline clock stage execution 316).

In cycles 4 and 5, in pipeline clock stages execution 317 and execution 318 respectively, functional unit 106 continues to process reg-data and produces a result at the end of cycle 5 (in pipeline clock stage 318). A check-data, output check-data 213, is generated from the result in cycle 6 (pipeline clock stage Gen-ECC 308), by output check-data generator 206. Also in cycle 6 (pipeline clock stage 307), the result is transferred to register file 105 on destination data bus 209.

In cycles 7 and 8, in pipeline clock stages xfer-ECC 309 and xfer-ECC 311 respectively, output check-data 213 is transferred to ECC register file 202. In an embodiment, ECC register file 202 is in a physical location that is 2-cycles away from functional unit 106. Also in cycle 7 (in pipeline clock stage RF WB 310), the result is written into register file 105. In cycle 9, the output check-data 213 is written into ECC register file 202.

Figure 4:
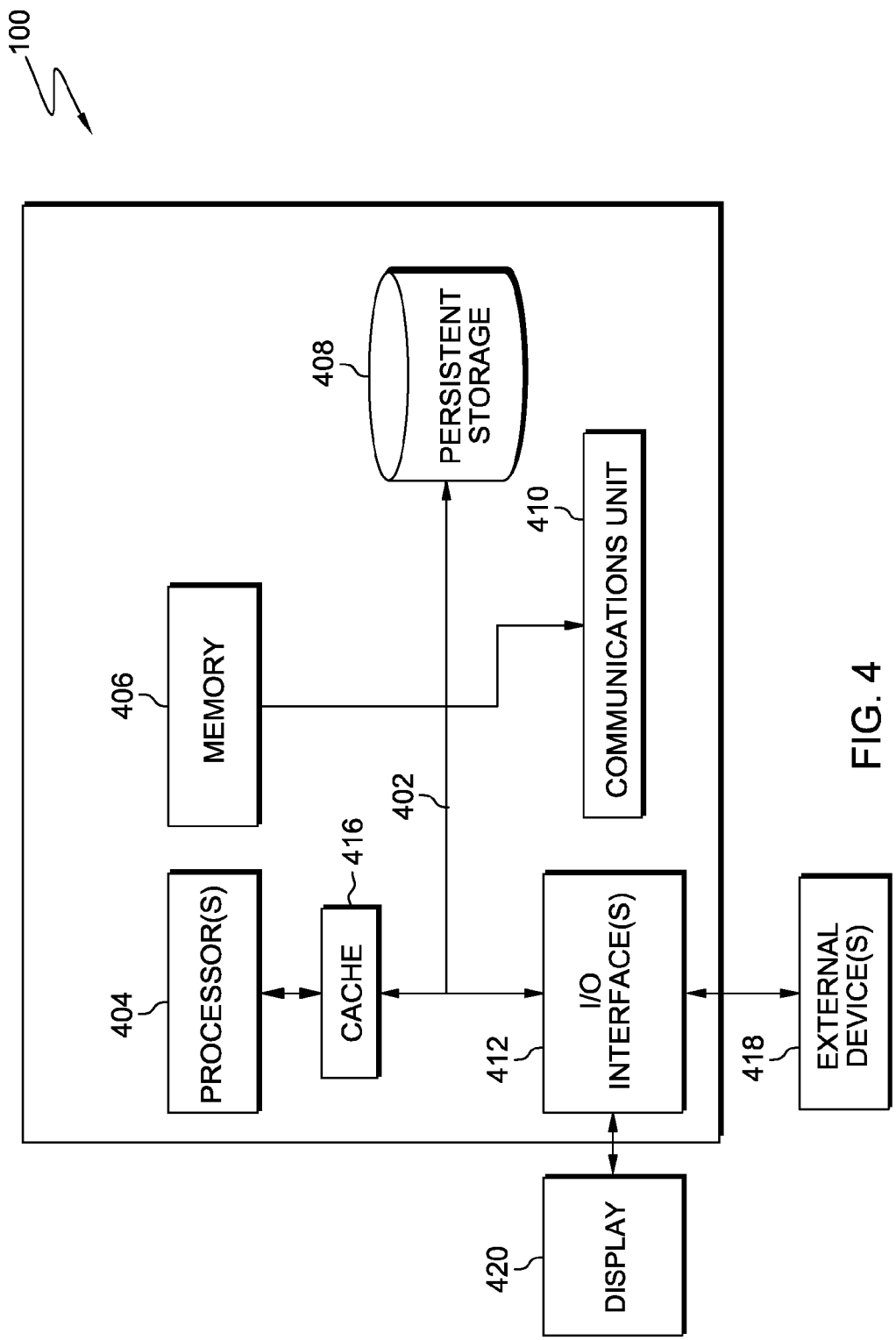
FIG. 4 depicts a block diagram of a computer system that incorporates the functional unit that is depicted FIGS. 1, 2 and 3, in accordance with an embodiment of the present invention.

FIG. 4 depicts computer system 100 that is an example of a system that includes processor 101. Processors 404 and cache 416 are substantially equivalent to processor 101. Computer system 100 includes communications fabric 402, which provides communications between computer processor(s) 404, memory 406, persistent storage 408, communications unit 410, and input/output (I/O) interface(s) 403. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data and data near accessed data from memory 406.

Program instructions and data used to practice embodiments of the present invention may be stored in persistent storage 408 for execution by one or more of the respective processors 404 via cache 416 and one or more memories of memory 406. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 403 may provide a connection to external devices 418 such as a keyboard, keypad, a touch screen, and/or some other suitable input device. External devices 405 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 403. I/O interface(s) 403 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

What is claimed is:

1. A computer hardware device to delocalize an error checking on a data in a pipelined processor from the data checked the computer hardware device comprising:
   a plurality of components, the plurality of components comprising:
      a first group of components, included in a plurality of components, generates a first check-data at a first location on a first data at the first location;
      a second group of components, included in the plurality of components, transfers the first data from the first location to a second location;
      a third group of components, included in the plurality of components, transfers the first check-data from the first location to the second location;
      a fourth group of components, included in the plurality of components, generates a second check-data on the first data at the second location;
      a fifth group of components, included in the plurality of components, compares the first check-data with the second check-data at the second location;
      a sixth group of components, included in the plurality of components, generates a second data from the first data at the second location;
      a seventh group of components, included in the plurality of components, generates a third check-data on the second data at the second location;
      an eighth group of components, included in the plurality of components, transfers the second data to a third location;
      a ninth group of components, included in the plurality of components, transfers the third check-data from the second location to a fourth location wherein the transfer of the third check-data from the second location to the fourth location takes one or more cycles;
      a tenth group of components, included in the plurality of components, generates a fourth check-data on the second data at the third location;
      an eleventh group of components, included in the plurality of components, transfers the fourth check-data from the third location to the fourth location wherein a the transfer of the fourth check-data from the third location to the fourth location takes one or more cycles; and
      a twelfth group of components, included in the plurality of components, compares the fourth check-data with the third check-data at the fourth location.

2. The computer hardware device of claim 1, wherein the first location and the third location are data registers in a register file in a pipelined processor.

3. The computer hardware device of claim 2, wherein the second location is an execution unit in a pipelined processor.

4. The computer hardware device of claim 1, wherein the check-data is parity data.

5. The computer hardware device of claim 1, wherein the check-data is ECC data.

6. The computer hardware device of claim 1, wherein the fourth location is an ECC register file containing ECC check-data data.

7. The computer hardware device of claim 1, wherein a data transfer from the third location to the fourth location takes one or more clock cycles.

8. A computer program product for delocalizing an error checking on a data in a pipelined processor from the data checked, the computer program product comprising:
   one or more computer readable storage media and program instructions stored on the one or more computer readable storage media, the program instructions comprising:
      program instructions to generate a first check-data at a first location on a first data at the first location;
      program instructions to transfer the first data from the first location to a second location;
      program instructions to transfer the first check-data from the first location to the second location;
      program instructions to generate a second check-data on the first data at the second location;
      program instructions to compare the first check-data with the second check-data at the second location;
      program instructions to generate a second data from the first data at the second location;
      program instructions to generate a third check-data on the second data at the second location;
      program instructions to transfer the second data to a third location;
      program instructions to transfer the third check-data from the second location to a fourth location wherein the transfer of the third check-data from the second location to the fourth location takes one or more cycles;
      program instructions to generate a fourth check-data on the second data at the third location;
      program instructions to transfer the fourth check-data from the third location to the fourth location wherein a the transfer of the fourth check-data from the third location to the fourth location takes one or more cycles; and program instructions to compare the fourth check-data with the third check-data at the fourth location.

9. The computer program product of claim 8, wherein the first location and the third location are data registers in a register file in a pipelined processor.

10. The computer program product of claim 9, wherein the second location is an execution unit in a pipelined processor.

11. The computer program product of claim 8, wherein the check-data is parity data.

12. The computer program product of claim 8, wherein the check-data is ECC data.

13. The computer program product of claim 8, wherein the fourth location is an ECC register file containing ECC check-data data.

14. A computer system for delocalizing an error checking on a data in a pipelined processor from the data checked, the computer system comprising:
one or more computer processors;
one or more computer readable storage medium;
program instructions stored on the computer readable storage medium for execution by at least one of the one or more processors, the program instructions comprising:
program instructions to generate a first check-data at a first location on a first data at the first location;
program instructions to transfer the first data from the first location to a second location;
program instructions to transfer the first check-data from the first location to the second location;
program instructions to generate a second check-data on the first data at the second location;
program instructions to compare the first check-data with the second check-data at the second location;
program instructions to generate a second data from the first data at the second location;
program instructions to generate a third check-data on the second data at the second location;
program instructions to transfer the second data to a third location;
program instructions to transfer the third check-data from the second location to a fourth location wherein the transfer of the third check-data from the second location to the fourth location takes one or more cycles;
program instructions to generate a fourth check-data on the second data at the third location;
program instructions to transfer the fourth check-data from the third location to the fourth location wherein a the transfer of the fourth check-data from the third location to the fourth location takes one or more cycles; and
program instructions to compare the fourth check-data with the third check-data at the fourth location.

15. The computer system of claim 14, wherein the first location and the third location are data registers in a register file in a pipelined processor.

16. The computer system of claim 15, wherein the second location is an execution unit in a pipelined processor.

17. The computer system of claim 14, wherein the check-data is parity data.

18. The computer system of claim 14, wherein the check-data is ECC data.

19. The computer system of claim 14, wherein the fourth location is an ECC register file containing ECC check-data data.

20. The computer system of claim 14, wherein a data transfer from the third location to the fourth location takes one or more clock cycles, and wherein a match between the fourth check-data and the third check-data indicates that no error has occurred.

* * * * *